Figure 1:
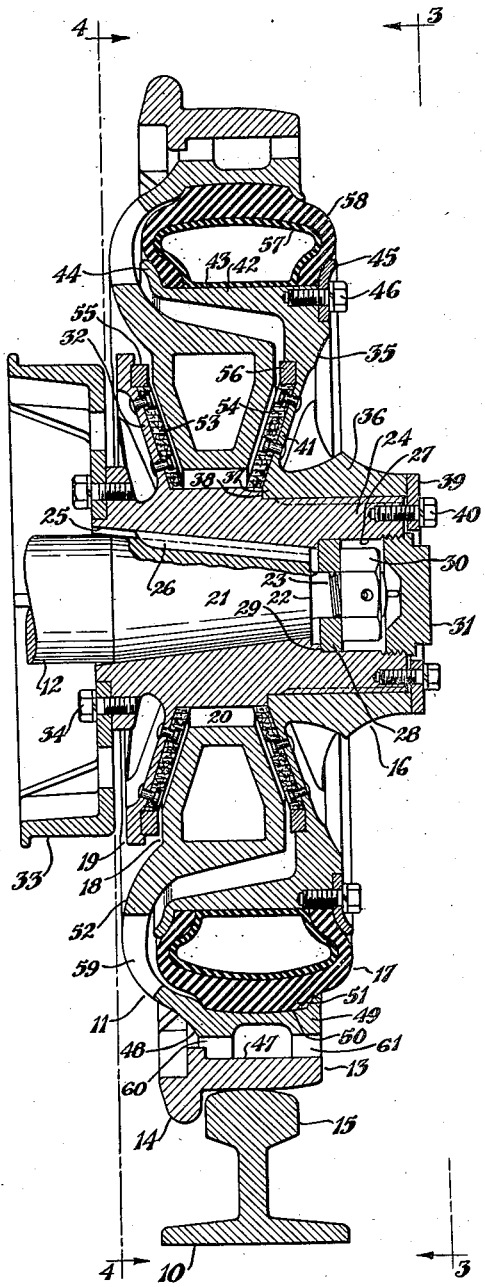

March 9, 1937.  M. HOWALD  2,073,534
PNEUMATIC CUSHION RAIL WHEEL
Filed Feb. 24, 1934

Inventor
M. Howald
By Frease and Bishop
Attorneys

Patented Mar. 9, 1937

2,073,534

UNITED STATES PATENT OFFICE 2,073,534

PNEUMATIC CUSHION RAIL WHEEL

Melville Howald, Massillon, Ohio

Application February 24, 1934, Serial No. 712,786

4 Claims. (Cl. 295—12)

My invention relates to pneumatic cushion rail wheels for use on railway cars, railway motor cars, and the like, the wheels rolling on the rails of a railway track system and always supporting proportionate parts of the load of the car, and sometimes driving the car and propelling any other cars which may be connected therewith as a train.

It has long been considered desirable to provide some form of cushion wheel for railway cars and railway motor cars and the like, to make such cars easier in their riding qualities, to better enable the attainment of high speeds, to facilitate the use of anti-friction bearings, and to minimize the transmission to the axles and other parts of the cars of vibrations and impact loads arising from the rolling of the wheels over track joints, switch frogs, cross-overs, and the like.

Resilient wheels including springs, solid rubber, and the like interposed between the wheel hubs and the wheel rims have proven unsatisfactory in most instances, because, among other things, of the crystallization and breaking of springs, and because of disintegration of the rubber under the heavy loads imposed thereon and the heat arising from the friction to which the solid rubber is subjected in the use of such wheels.

Various types of pneumatic cushion rail wheels have also been proposed including pneumatic cushion tires similar to automobile tires, but the pneumatic cushion rail wheels of which I am aware prior to the present improvements and other improvements of which I am the inventor, have been unsatisfactory in use because of the lack of any, or inadequate, provisions for properly supporting the axles and the car, when the pneumatic cushion tires blew out, and also because in many instances the rubber treads of usual pneumatic cushion rail wheels have rolled directly on the rails, with consequent very short life, and with relative low load sustaining capacity, and with insufficient capacity to sustain the thrust loads set up in the wheels when the car turns curves in the tracks.

The foregoing indicates some of the difficulties which are incident to all usual pneumatic cushion rail wheels of which I am aware prior to the present improvements and other improvements of which I am the inventor, whether the wheels be used as idlers, that is as mere rolling supports for the car, or as drivers, that is where the wheels are drive connected with axles and the axles are rotated by a motor for propulsion purposes; and in the case of driver pneumatic cushion rail wheels, a further difficulty is encountered because when the usual pneumatic tires blow out, proper drive of the wheel is impaired if not rendered impossible.

The objects of the present improvements include in general the provision of improved pneumatic cushion rail wheels adapted for overcoming the foregoing difficulties.

More particular objects of the present invention are as follows:

First, to provide a pneumatic cushion rail wheel which is adapted for use either as an idler or a driver;

Second, to provide an improved construction and arrangement for a rail wheel including a pneumatic cushion tire and an improved metallic flanged annular rail band carried by the tire and rolling on the rail;

Third, to provide an improved pneumatic cushion rail wheel including a metallic annular rail band carried by a pneumatic cushion tire whose movements including up and down and side flexing are controlled;

Fourth, to provide a pneumatic cushion rail wheel adapted for setting up air circulation for preventing the tire thereof from overheating;

Fifth, to provide a pneumatic cushion rail wheel having a rigid metallic rail band, rigid metallic hub members, a pneumatic cushion rubber tire interposed between the rigid metallic hub members and the rigid metallic rail band, the tire being normally inflated and maintaining the rail band and hub parts in yielding load sustaining relationship with each other, and the rail band and hub members being constructed and arranged so that when the tire deflects by excessive deflation beyond a predetermined degree the inner hub members will be engaged in direct load sustaining relationship with each other; and Sixth, to provide a pneumatic cushion rail wheel having an outer metallic rail band, inner hub members, and a pneumatic rubber tire interposed between the same, and in which there is substantially no relative rotary movement between the hub members, the tire and the rail band either when the tires are properly inflated or when the tire has been excessively deflated.

The foregoing and other objects are attained by the improvements, apparatus, parts, combinations, and sub-combinations, which comprise the present invention, and the nature of which is set forth in the following general statement, and preferred embodiments of which, together with their mode of use, are set forth in the following description, and which are particularly and distinctly pointed out and set forth in the appended claims forming part hereof.

The nature of the improved pneumatic cushion rail wheels of the present invention may be stated in general terms as including inner annular means, outer annular means, annular pneumatic means interposed between and engaging the inner and outer annular means, the pneumatic annular means being normally inflated with compressed air and maintaining the inner and outer annular means in yielding load sustaining relationship with each other, and co-operable stop means on the inner and outer annular means, the stop means being normally spaced from one another with respect to the axis of rotation of the wheel and with respect to a plane at right angles to the axis of rotation of the wheel, and being arranged to limit relative movement of the inner and outer annular means with respect to each other, and to engage both radially and laterally the inner and outer annular means in direct load sustaining relationship with each other after a predetermined deflation of the pneumatic annular means.

The outer annular means are preferably rigid and include a rail band for rolling on one rail of a railway track, and the stop means for the outer annular means is preferably an annular wedge.

The inner annular means may be otherwise termed hub members, and are preferably rigid, and the stop means on the inner annular means preferably form an outwardly opening V groove, in which the annular wedge stop of the outer annular means is located.

Opposite preferably frusto-conical walls of the V groove are preferably provided with linings preferably made of heat resisting material such as asbestos, and are also preferably provided with side bearing rings.

Figure 2:
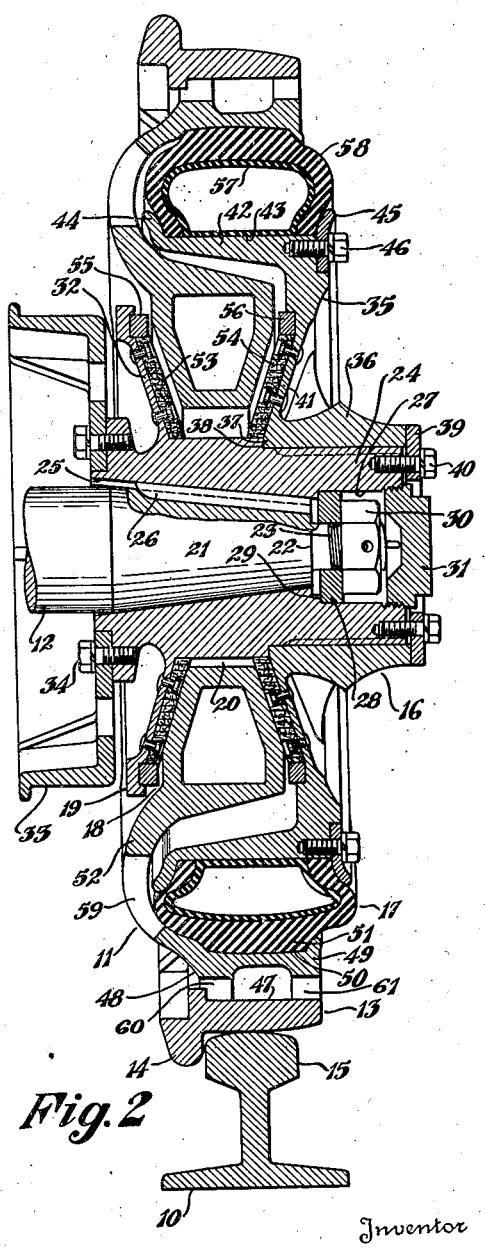

Preferred embodiments of the improved pneumatic cushion rail wheels are illustrated in the accompanying drawing forming part hereof, in which Figure 1 is a vertical sectional view as on lines 1—1, Figs. 3 and 4 of one embodiment of the improved pneumatic cushion rail wheel of the present invention, the wheel being a driver wheel and being illustrated in position on a rail, and in supporting engagement with the axle of a railway car, other parts of the car not being shown, and the improved wheel including a pneumatic cushion tire in normally inflated position between inner and outer annular means, and the several parts of the wheel being illustrated in their relative positions with such normal inflation of the tire;

Fig. 2, a view similar to Fig. 1 in which the tire has been subject to deflation to a predetermined degree, and the annular stop means on the inner and outer annular means have been displaced to direct load sustaining relationship with each other.

Similar numerals refer to similar parts throughout the drawing.

In Figs. 1 to 4 inclusive, there is illustrated one rail 10 of a railway track, on which one embodiment of the improved pneumatic cushion rail wheel of the present invention is in operative position and is indicated generally by 11 and is secured on the outer end of an axle 12 of a railway car, not otherwise shown.

The improved wheel 11 includes rigid outer annular means indicated generally by 13 and having an outer flanged rail band 14 whose outer peripheral surfaces are similar to the outer peripheral surfaces of a usual flanged railway car wheel, and which roll on and operate against the head flange 15 of the rail 10.

The improved wheel 11 furthermore includes inner supporting means indicated generally by 16 and which as illustrated constitute inner annular means, and which are secured on the outer end of the axle 12.

Yielding means, preferably annular pneumatic cushion tire means indicated generally by 17 are interposed between the outer annular means 13 and the inner annular means 16; and the pneumatic tire means 17 are normally inflated to a pressure so as to maintain the inner and outer annular means in yielding load sustaining relationship with each other, thus cushioning the axle and other parts supported by the wheel, as the wheel rolls along the track.

The outer annular means 13 also includes stop means indicated generally by 18, which is preferably in the form of an annular wedge stop, as illustrated; and the inner annular means 16 includes stop means indicated generally by 19, and which are preferably in the form of outwardly opening V groove walls; and the annular wedge 18 of the outer annular means 13 is located in the groove space 20 of the groove wall stop means 19; and the wedge stop means 18 and the groove wall stop means 19 are normally spaced from each other with respect to the axis of rotation of the wheel and with respect to a plane at right angles to the axis of rotation of the wheel when the tire 17 is normally inflated, as illustrated in Fig. 1, so as to limit relative movement of the inner and outer annular means 16 and 13 with respect to each other, and so as to engage both radially and laterally the inner and outer annular means in direct load sustaining relationship with each other, after a predetermied deflection of the pneumatic tire means 17, or in other words after a predetermined degree of deflation of the tire 17.

The relative positions of the parts of the improved wheel 11, under conditions of normal tire inflation as aforesaid are shown in Fig. 1; and the relative positions of the several parts of the improved wheel 11 after excessive deflection of the pneumatic tire 17 are shown in Fig. 2, in which the inner annular means and the axle secured therewith have dropped into direct load sustaining relationship with the outer annular means, thus relieving the load from the deflated or blown out tire 17 in the condition shown in Fig. 2.

In the embodiment 11 of the improved pneumatic cushion rail wheel illustrated in connection with a railway car and the like in Figs. 1 to 4 inclusive, the car axle 12 has an outer frusto-conical tapered portion 21 whose minimum diameter is at its outer end 22 and the axle 12 terminates in a threaded end portion 23 whose diameter is less than the minimum diameter of the frusto-conical portion 21.

The inner annular means 16 includes a hub 24 having a bore including at its inner end a frusto-conical tapered portion 25 which fits and seats upon the frusto-conical tapered portion 21 of the axle 12 and key means indicated generally by 26 are interposed between the tapered portion 21 of the axle and the tapered portion 25 of the hub bore, and provide a driving connection between the axle and the wheel.

The bore of the hub 24 also includes at its outer end a counterbored socket 27 whose diameter is larger than the minimum diameter of the tapered portion of the hub bore, and a clamping ring 28 is located on the shank of the threaded end 23 of the axle 12, and abuts against the bottom seat 29 of the counterbored socket 27, and a nut 30 screwed on the threaded axle outer end 23 secures the wheel 11 in place on the axle 12.

An externally threaded closure 31 may be and preferably is provided and screwed into the internally threaded outer end of the counterbored socket 27.

The hub 24 furthermore includes at its inner side, a frusto-conical groove forming wall 32; and a brake drum 33 may be and preferably is removably secured to the inner end face of the hub 24 as by cap screws 34.

The inner annular means 16 furthermore include as illustrated an annular unit 35 having a hub portion 36 whose bore is internally splined and drive fitted upon externally splined outer end portions of the hub 24. The inner end 37 of the hub portion 36 of the unit 35 abuts against an annular side seat 38 formed externally on the hub 24, and a clamping ring 39 abuts against the outer end of the hub portion 36, and cap screw means 40 serve to clamp the ring 39 against the outer end of the hub portion 36 and secure the annular unit 35 in place on the hub 24.

The annular unit 35 also includes a frusto-conical web and groove forming wall 41 which extends outwardly from the hub portion 36, and the annular unit 35 also includes as illustrated a rim forming outer annular flange 42.

The annular flange 42 includes an externally cylindric base portion 43 terminating at its inner end in an annular rim side rib 44.

At the outer end of the cylindric base portion 43, a removable annular rim side rib 45 is secured to the annular unit 35 as by cap screw means 46; and the cylindric rim base portion 43, the rim side rib 44, and the removable side rib 45 form a rim seat for the pneumatic cushion tire means 17.

The outer annular means 13 as aforesaid includes an externally flanged rail band 14 having an internal cylindric counterbored seat 47 which is shrunk upon externally cylindric faces of an annular tire band and stop unit 48 including an annular tire band 49 externally seating the rail band 14, and having an internal shallow annular tire seat channel 50 which seats the external annular tread 51 of the tire means 17.

The outer annular means 13 furthermore includes as aforesaid the annular wedge stop 18, which as shown is an integral part of the unit 48 and includes the annular wedge stop 18 which is located in the outwardly opening V groove formed by the wall 32 of the hub 24 and the wall 41 of the unit 35, and which is connected with the annular tire band 49 by an annular web wall 52 which curves about and is spaced from the inner side of the casing of the tire means 17 and the rim forming outer annular flange 42 of the annular unit; and the wedge 18 is located below the base portion 43 of the flange 42, and the tire band 49 is located above the flange 42 and the tire 17, which as aforesaid is interposed between the rim seat on the annular unit 35 and the tire band 49 of the annular unit 48.

The inner face of the groove forming walls 32 and 41 taper similarly and oppositely away from each other forming an outwardly opening V groove, preferably having a flat base, and the inner faces of the walls 32 and 41 are preferably provided with heat resisting linings 53 and 54 respectively made of fibrous material, such as asbestos, and at the outer larger base ends of the frusto-conical walls 32 and 41, side bearing rings 55 and 56 are preferably provided.

The pneumatic tire means 17 preferably includes an inner tube 57 and a casing 58 generally similar in construction to an automobile tire.

The outer annular means 13 is preferably made of metal such as steel, and by making the same preferably of steel, and also by the annular and transversely curved form of the same as illustrated, the outer annular means 13 is rigid, and maintains its shape with respect to its rotary action in use and under the loading conditions imposed thereon.

Similarly the inner annular means 16, with the exception of the fibrous linings 53 and 54 and the preferably graphite impregnated bronze rings 55 and 56, is preferably made of steel parts, and by the use of this material and by conformation of the same as illustrated, the inner annular means 16 is rigid.

By the use of rigid inner and outer annular means 13 and 16, the life of the pneumatic cushion means 17 interposed therebetween is greatly extended, and relatively great loads may be safely carried by the wheel.

The side groove forming walls 32 and 41 with the preferred bearing rings 55 and 56 limit the side movement of the outer annular means 13, by reason of side flexing of the tire means 17 when the wheel rolls around a curve or the like, the sides of the annular wedge stop 18 abutting respectively against the adjacent bearing ring 55 or 56.

When, because of a blow-out or the like, the tire means 17 is subject to a predetermined deflection or in other words is deflated beyond a certain degree, the axle 12 and the inner annular means 16 mounted thereon drop down, and the preferably lined V groove side walls 53 and 54 drive roll on the annular wedge stop 18 as shown in Fig. 2.

Consequently, there is substantially no rotary slippage between the outer and inner annular means 13 and 16 and the pneumatic cushion means 17 interposed therebetween.

The annular unit 48 of the outer annular means 13 has preferably formed therein ventilating openings 59 in the web 52, and also ventilating openings 60 and 61 in the outer flange legs of the preferably channel-shaped band 49.

The provision of the ventilating openings 59, 60, and 61 in the unit 48 provides for a cooling of the tire means 17.

I claim:

1. A wheel including inner annular means, outer annular means, pneumatic means interposed between the inner and outer annular means, the pneumatic means being normally inflated and maintaining the inner and outer annular means in yielding load sustaining relationship with each other, tapered wedge means on one of the annular means, and tapered groove means on the other annular means, the wedge and groove means being normally spaced from one another radially with respect to the axis of rotation of the wheel and laterally with respect to a plane at right angles to the axis of rotation so as to limit relative movement of the inner and outer annular means with respect to each other and so as to engage each other radially and laterally and maintains the inner and outer annular means in direct load sustaining relationship with each other after a predetermined deflection of the pneumatic means.

2. A wheel including inner rigid annular means, outer rigid annular means, pneumatic means interposed between the inner and outer rigid annular means, the pneumatic means being normally inflated and maintaining the inner and outer rigid annular means in yielding load sustaining relationship with each other, tapered wedge means on one of the rigid annular means, and tapered groove means on the other rigid annular means, the wedge and groove means being normally spaced from one another radially with respect to the axis of rotation of the wheel and laterally with respect to a plane at right angles to the axis of rotation so as to limit relative movement of the inner and outer rigid annular means with respect to each other and so as to engage each other radially and laterally and maintain the inner and outer rigid annular means in direct load sustaining relationship with each other after a predetermined deflection of the pneumatic means.

3. A wheel including inner annular means, outer annular means, yielding means interposed between the inner and outer annular means, the yielding means normally maintaining the inner and outer annular means in yielding load sustaining relationship with each other, tapered tongue means on one of the annular means, and tapered groove means on the other annular means, the tongue and groove means being normally spaced from one another radially with respect to the axis of rotation of the wheel and laterally with respect to a plane at right angles to the axis of rotation so as to limit relative movement of the inner and outer annular means with respect to each other and so as to engage each other radially and laterally and maintain the inner and outer annular means in direct load sustaining relationship with each other after a predetermined deflection of the yielding means.

4. A wheel including inner annular means, outer annular means, yielding means interposed between the inner and outer annular means, the yielding means normally maintaining the inner and outer annular means in yielding load sustaining relationship with each other, an annular conical wedge on one of the annular means and annular conical groove walls on the other annular means, the wedge and groove walls being normally spaced from one another radially with respect to the axis of rotation of the wheel and laterally with respect to a plane at right angles to the axis of rotation so as to limit relative movement of the inner and outer annular means with respect to each other and so as to engage each other radially and laterally and maintain the inner and outer annular means in direct load sustaining relationship with each other after a predetermined deflection of the pneumatic means.

MELVILLE HOWALD.